United States Patent [19]

Graves

[11] Patent Number: 4,880,271
[45] Date of Patent: Nov. 14, 1989

[54] ADJUSTABLE LUMBAR SUPPORT

[75] Inventor: Lee K. Graves, Bloomfield, Mich.

[73] Assignee: Wickes Manufacturing Company, Southfield, Mich.

[21] Appl. No.: 289,539

[22] Filed: Dec. 23, 1988

Related U.S. Application Data

[63] Continuation of Ser. No. 137,905, Dec. 28, 1987, abandoned.

[51] Int. Cl.$^4$ ............................................... A47C 7/46
[52] U.S. Cl. .................................................... 257/284
[58] Field of Search .............................. 297/284, 460

[56] References Cited

U.S. PATENT DOCUMENTS

| | | | |
|---|---|---|---|
| 1,182,854 | 5/1916 | Poler | 297/284 |
| 2,254,379 | 9/1941 | Millar | 297/284 |
| 2,843,195 | 7/1958 | Barvaeus | 297/284 |
| 3,378,299 | 4/1968 | Sandor | 297/284 |
| 4,019,777 | 4/1977 | Hayashi | 297/284 |
| 4,156,544 | 5/1979 | Swenson et al. | 297/284 |
| 4,354,709 | 10/1982 | Schuster | 297/284 |
| 4,452,485 | 6/1984 | Schuster | 297/284 |
| 4,588,172 | 5/1986 | Fourrey et al. | 297/284 X |
| 4,601,514 | 7/1986 | Meiller | 297/284 |

Primary Examiner—Peter A. Aschenbrenner
Attorney, Agent, or Firm—David A. Greenlee

[57] ABSTRACT

A lumbar support for a motor vehicle seat or the like is provided. The support includes a pair of vertically mounted bands supported by an upper support band and a bracket, respectively. The vertical bands are bowed towards the front of the seat. An adjustment band is pivotably mounted to a rotatable plate on the bracket for controlling the bowing of the vertical bands. A spring is mounted between the upper support band and the bracket and pulls them towards each other.

3 Claims, 4 Drawing Sheets

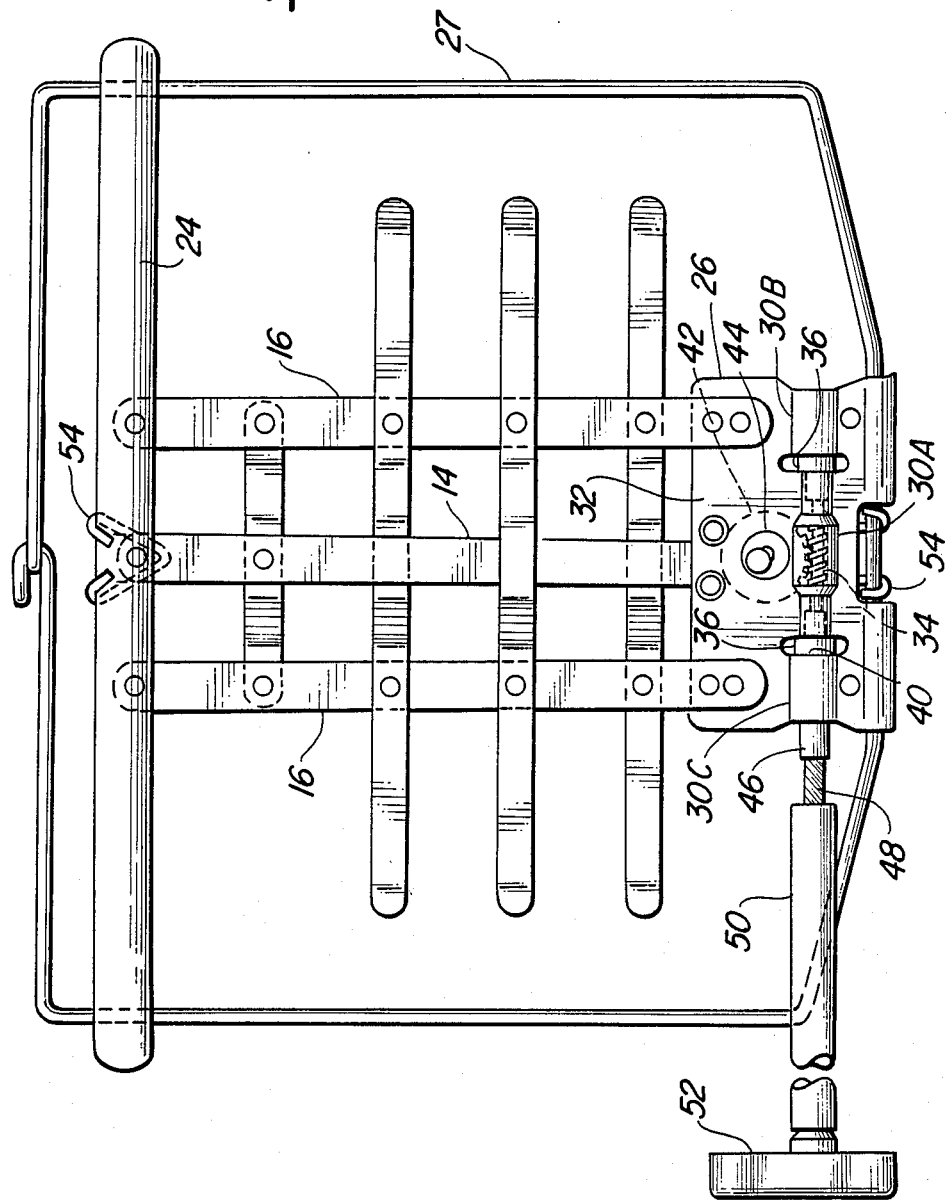

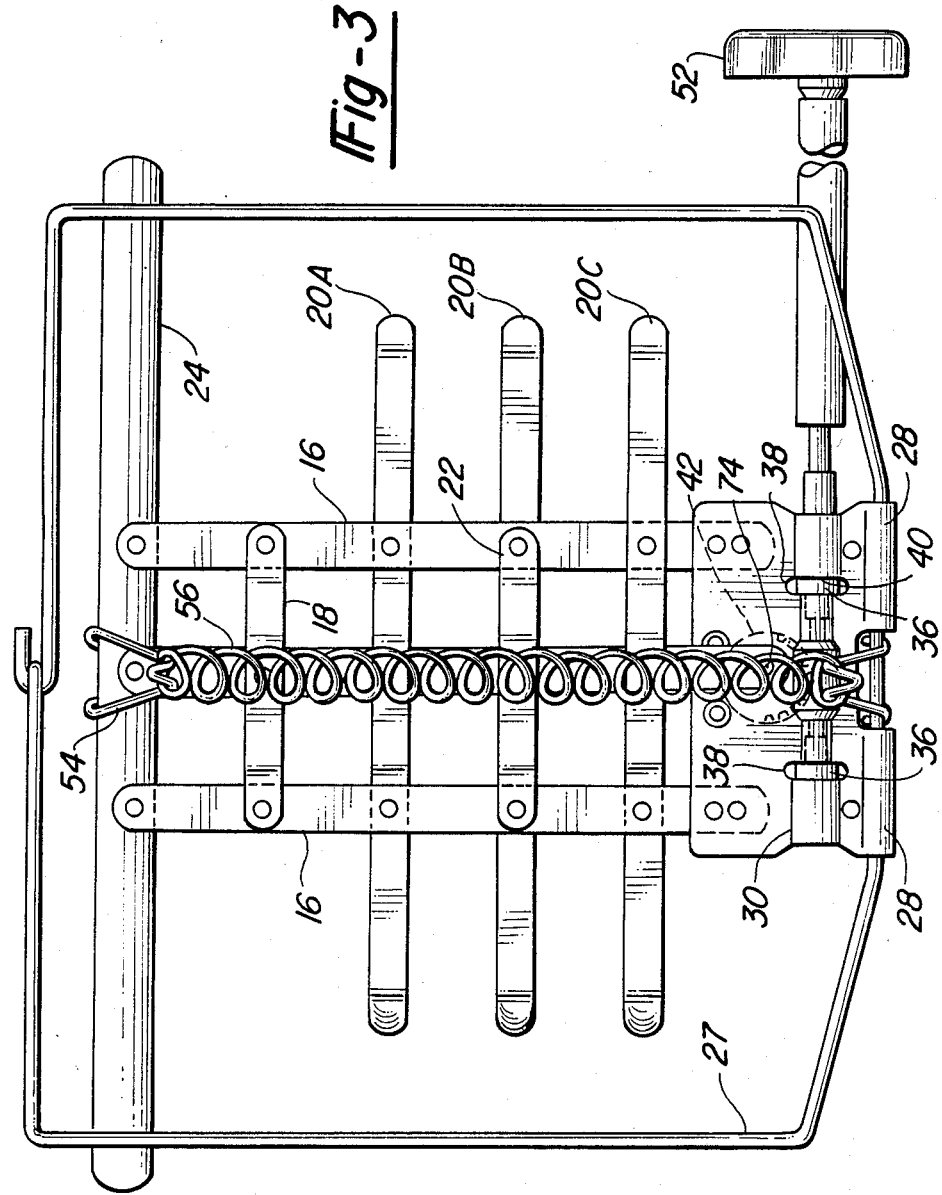

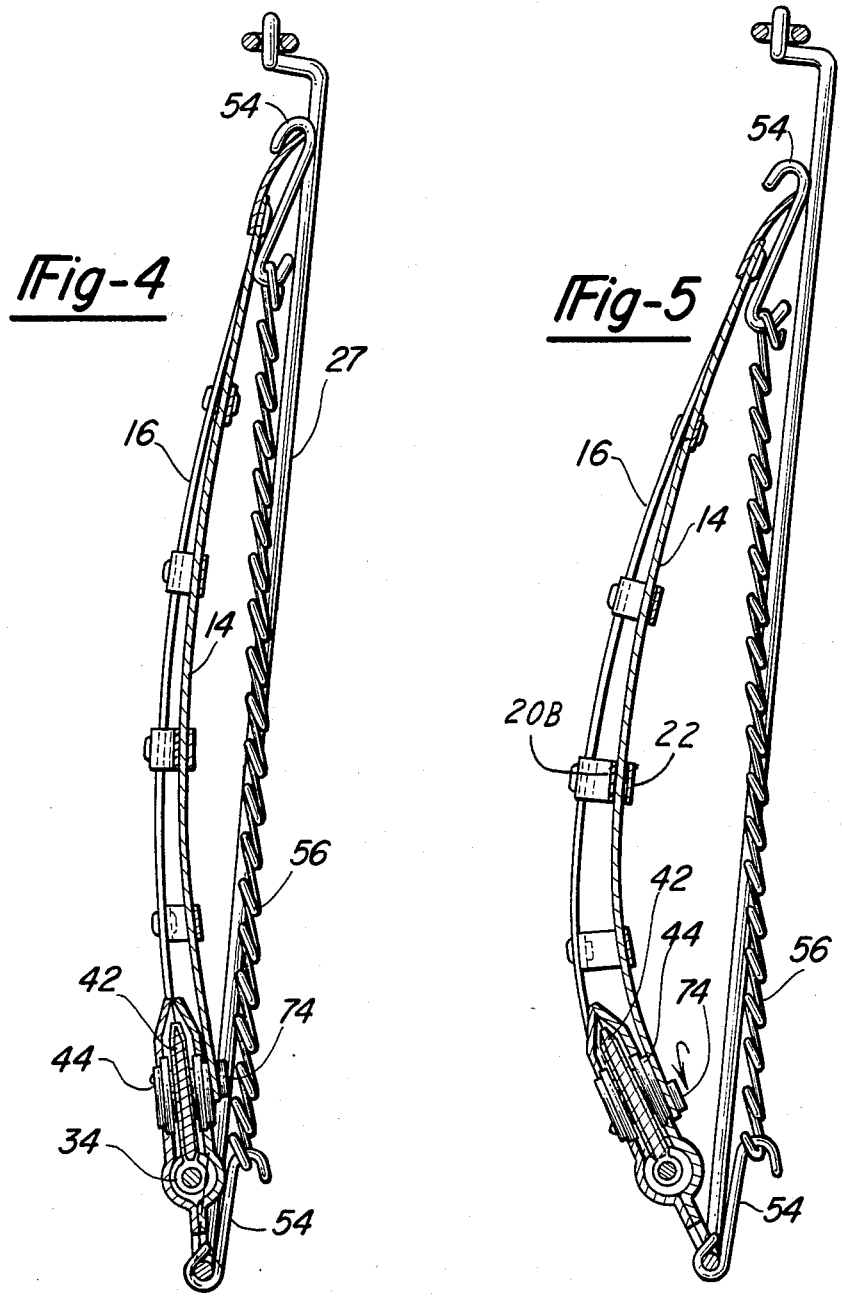

ADJUSTABLE LUMBAR SUPPORT

This application is a continuation of Ser. No. 137,905, filed Dec. 28, 1987, now abandoned.

BACKGROUND OF THE INVENTION

1. Field of the Invention

The field of the invention relates to adjustable lumbar supports, particularly for motor vehicle seats.

2. Brief Description of the Prior Art

Many motor vehicle seats are today equipped with manually-operated or electrically driven lumbar supports. Such supports provide superior comfort, particularly during long drives. The adjustability of the lumbar supports allows each driver or passenger to provide the necessary curvature therein to suit his individual needs. U.S. Pat. Nos. 4,354,709 and 4,452,485 disclose a support structure including adjustment means for varying the curvature thereof through the use of a pair of opposing belts and means for bowing one set of belts with respect to the other.

Another type of lumbar support includes a series of three vertically oriented bands and a series of horizontal ribs secured to two or more of the bands. The middle band is secured at one end to a tensioning device while the two other bands are secured at both ends to substantially fixed supports. When the middle band is tensioned, both it and the two adjacent bands will bow, thereby providing the desired curvature to the portion of the seat to which it is secured. The effort required to increase the tension of the middle band increases as the curvature of the support increases.

SUMMARY OF THE INVENTION

The invention concerns an improved lumbar support including means for facilitating adjustments in the curvature thereof such that the effort required to increase or decrease curvature is substantially the same.

A support in accordance with the invention includes top and bottom support members and one or more bands connected therebetween. Means are provided for increasing or decreasing the distance between the support members, thereby decreasing or increasing the curvatures of the bands connected therebetween. In order to equalize the forces necessary to adjust the curvature of the support, means are provided for urging the support members toward each other. Such means preferably include a spring secured to each support member and opposing the concave arc of the bands.

BRIEF DESCRIPTION OF THE DRAWINGS

FIG. 2 is a front elevation view of the lumbar support;

FIG. 3 is a rear elevation view thereof;

FIG. 4 is a side elevation view thereof showing the lumbar support a relatively large radius of curvature; and FIG. 5 is a side elevation view thereof showing the lumbar support having a relatively small radius of curvature.

DETAILED DESCRIPTION OF THE INVENTION

Figure 1:
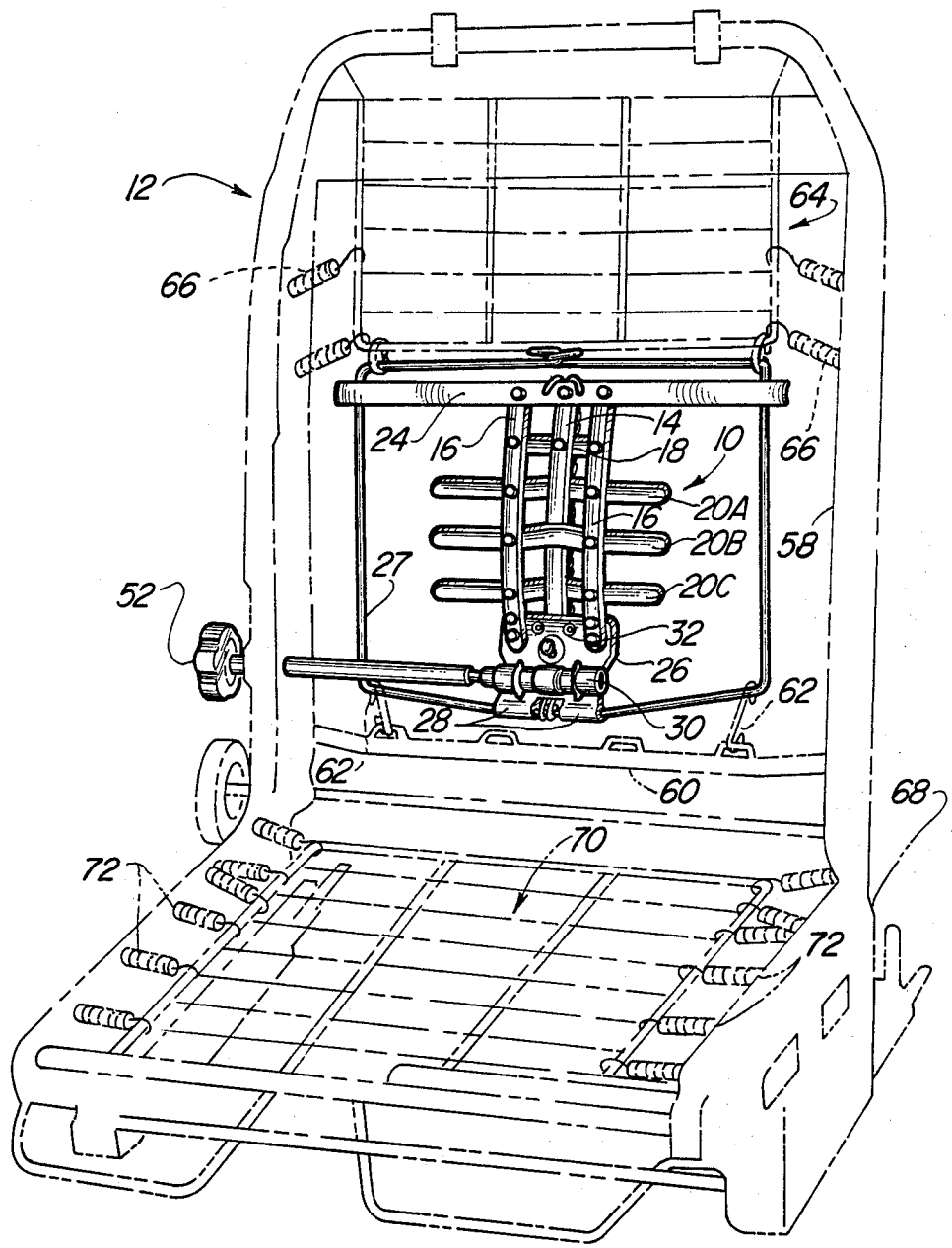
FIG. 1 is a perspective view of a lumbar support mounted to a motor vehicle seat.

A lumbar support 10 is provided for mounting to a motor vehicle seat 12 as shown in FIG. 1. The support includes three flexible, vertically oriented steel bands, the middle band 14 having a smaller width than either adjacent band 16. A plurality of substantially horizontal ribs are respectively connected to two or more of the bands. The top rib 18 is riveted to all three bands. Three relatively long ribs 20A, 20B, 20C are each secured to the two outer bands 16. A fifth rib 22, having substantially the same length as the top rib 18, is secured to the two outer bands in opposing relation to the middle long rib 20B as shown in FIG. 3. The middle band 14 extends between the two opposing ribs 20B,22 and in front of all the other ribs. Since the middle band is not coplanar with the adjacent bands 16, each rib has a configuration resembling three sides of a trapezoid. The center of each rib is flat and substantially parallel to the laterally extending portions thereof. The tips of the longer ribs are bent rearwardly to avoid damaging the seat upholstery or causing discomfort.

Each vertical band 14,16 is riveted to a top, horizontal band 24. This band is bent rearwardly along a longitudinal axis thereof. The two outside vertical bands 16 are each riveted to the front surface of a bracket 26. A wire frame 27 extends through a pair of cylindrical tubes 28 defined by the bottom portion of the bracket. The frame may also be secured to the top band 24.

The bracket is constructed from a pair of stamped plates which are riveted together to define a pair of cylindrical tube structures 28,30 and a rectangular compartment 32. A worm gear 34 is positioned centrally within an expanded portion 30A of the upper tube 30 which is substantially contiguous with the rectangular compartment. Each end of the worm gear is secured to a cylindrical member 36. These cylindrical members are rotatable within the outer sections 30B,30C of the upper tube structure. Each extends through one of the respective slotted openings 38 and abuts the respective walls 40 defining the openings to the central portion of the cylindrical tube structure 30. This arrangement maintains the worm gear 34 in precise position.

A gear 42 is positioned within the rectangular compartment 32 of the bracket 26 and engages the worm gear 34. A cylindrical plate 44 is secured to each side of the gear 42, each plate extending through a circular opening in the bracket. The middle vertical band 14 is pivotably secured to the plate 44 at the rear side of the bracket.

The worm gear 34 is rotated about its longitudinal axis when the cylindrical member 36 on one side thereof is rotated. This cylindrical member includes a hexagonal opening for receiving the end of a hexagonally shaped actuating member 46 which is secured to a cable 48. The cable 48 is protected by a sheath 50 and secured to a knob 52.

A pair of wire hooks 54 are secured to the top band 24 and the bottom of the wire frame 27, respectively. A spring 56 is secured to the hooks. As shown in FIGS. 4 and 5, the bands of the lumbar support bow towards the front thereof to provide support for a person's back. The spring urges the top and bottom ends of the support toward each other. In addition to promoting the desired bow-shaped profile, it equalizes the forces required to turn the knob 52 in either direction. In the absence of such a spring, it would be considerably more difficult to increase the bowing of the bands than to return the fully bowed structure shown in FIG. 5 to the more relaxed configuration illustrated in FIG. 4.

Referring again to FIG. 1, the lumbar support 10 is mounted to the backrest frame 58 of the motor vehicle seat 12. The wire frame 27 may be secured directly to a cross member 60 of the frame or by clamps 62 as shown in the figures. A wire support 64 including stringer wires, border wires and bolster wires may be employed to secure the top end of the lumbar support to the backrest frame. The wire support is secured to the backrest frame 58 by a plurality of springs 66.

The seat portion of the vehicle seat includes a frame 68, a wire support 70, and a plurality of springs 72 for securing the wire support to the seat frame. The backrest is preferably pivotably secured to the seat portion.

In operation, the lumbar support 10 is adjustable between the positions shown in FIGS. 4 and 5. The knob 52 may be turned in either direction a full 360°. This causes the cable 48 to turn about its longitudinal axis and the worm gear 34 to rotate. The circular gear 42, which engages the worm gear, rotates about its axis, as do the plates 44 mounted to the gear 42. The middle band 14, being pivotably secured at an off-center position to the rear plate, is pushed up as far as shown in FIG. 4 or pulled down to the position shown in FIG. 5. The relative positions of the pivot pin 74 in these figures indicates the range of vertical movement of the middle band, which in the preferred embodiment is about one-half inch.

Since the two outer bands 16 are fixedly secured to the bracket 26, they must either bend when the middle band moves downwardly or straighten when it moves in the opposite direction. The spring 56 stretches as the bands 16 straighten and contracts as they bend. It thereby reduces the effort necessary to increase the bowing of the bands 16 while increasing the force required to straighten them. The knob 52 may accordingly be turned in either direction by an operator using substantially equal turning force.

What is claimed is:

1. An adjustable lumbar-support for a vehicle seat comprising a top support member, a bottom support member, a vertically-extending convex flexible band secured to both support members and having a resilience opposing increasing convexity, means for adjusting the distance between the supports to vary the convexity of the flexible band, and spring means interconnecting the supports to bias the flexible band toward increasing convexity in opposition to the resilience of the flexible band, characterized by the adjusting means including a second flexible band affixed to one of the support members and movably mounted on the other support member.

2. The lumbar support of claim 1, further characterized by the bottom support member including a bracket mounting the first band and the adjusting means including a plate pivoted to the bracket for rotation about a first axis, the second band being pivoted to the plate about a second axis parallel to the first such that rotation to the plates moves the support members relative to each other which varies the convexity of the first flexible band.

3. The lumbar support of claim 2, further characterized by a peripheral wire frame mounting both support members to enable attachment of the lumbar support as a unit to a seat structure and the spring means comprising an elongated coil spring in tension urging the support members toward each other.

* * * * *